United States Patent [19]

Helbling, Jr. et al.

[11] Patent Number: 4,708,852

[45] Date of Patent: Nov. 24, 1987

[54] UNIFORM FLOW DISTRIBUTING MEANS FOR A TRICKLE BED FLOW REACTOR

[75] Inventors: Clements A. Helbling, Jr.; Robert M. Steinberg, both of Houston, Tex.

[73] Assignee: Texaco Inc., White Plains, N.Y.

[21] Appl. No.: 720,912

[22] Filed: Apr. 8, 1985

[51] Int. Cl.⁴ .............................. G05D 9/00; B01J 8/02
[52] U.S. Cl. ..................................... 422/220; 208/146; 261/98; 261/113; 422/191
[58] Field of Search ........................ 422/190, 191, 220; 208/49, 146, 303; 261/94, 113

[56] References Cited

U.S. PATENT DOCUMENTS

| | | | |
|---|---|---|---|
| 2,767,967 | 10/1956 | Hutchinson | 261/113 |
| 3,112,256 | 11/1963 | Young et al. | 422/41 |
| 4,235,847 | 11/1980 | Scott | 208/49 |
| 4,526,757 | 7/1985 | Gupta | 422/220 |

Primary Examiner—Barry S. Richman
Assistant Examiner—William R. Johnson
Attorney, Agent, or Firm—Robert A. Kulason; James J. O'Loughlin; Ronald G. Gillespie

[57] ABSTRACT

Uniform flow distributor for trickle bed flow through a bed of solid catalyst particles. The reactants include constituents of a liquid and vapor mixture. A corrugated distributor acts to form pools of the liquid at normal minimum rate of flow and the vapor flows past the liquid pools to form a uniform mixture in the bed of catalyst particles.

11 Claims, 6 Drawing Figures

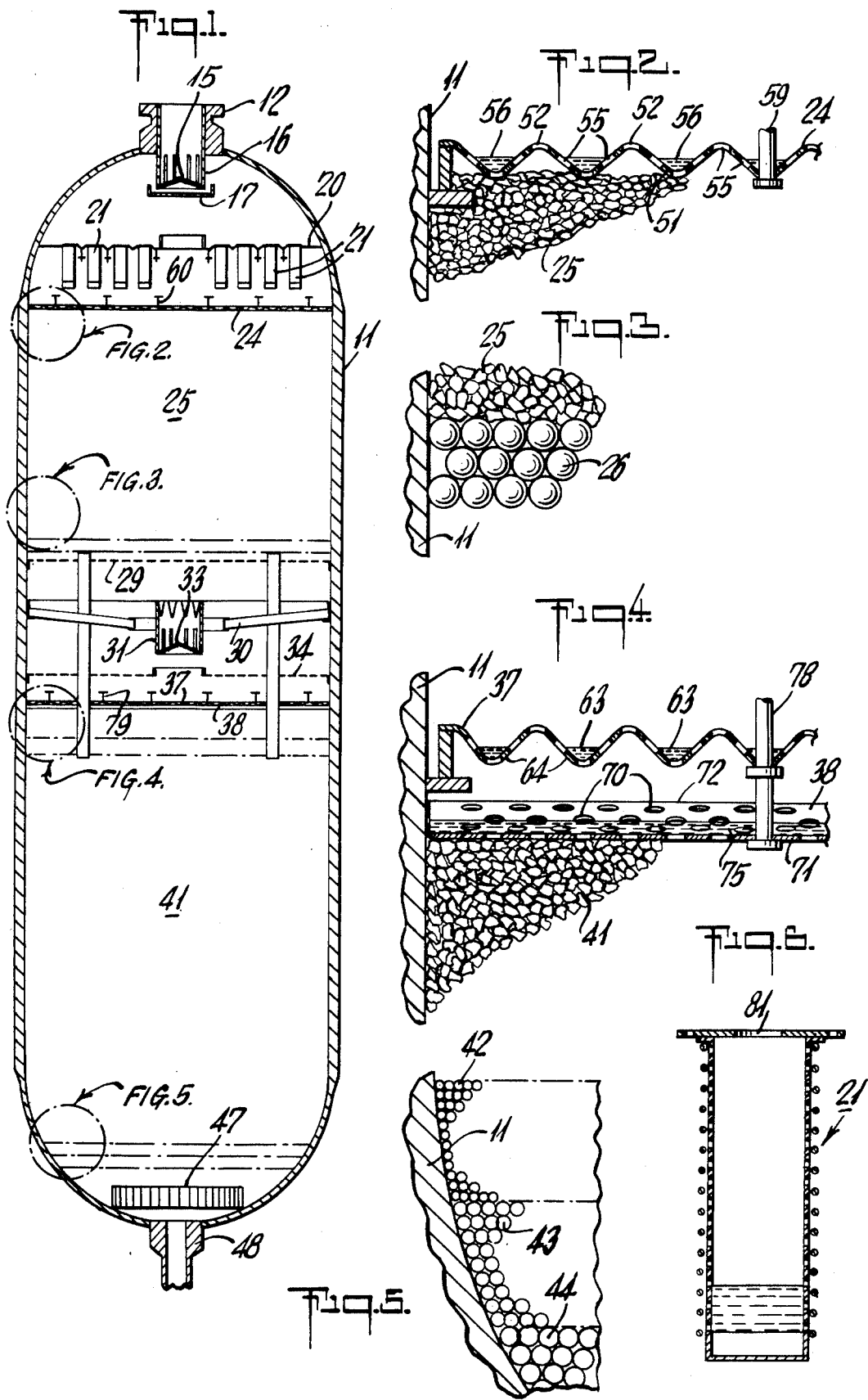

UNIFORM FLOW DISTRIBUTING MEANS FOR A TRICKLE BED FLOW REACTOR

This invention concerns the distribution of vapor-liquid feed in a fixed-bed reactor, in general. More specifically, it concerns an improved method and apparatus for making a uniform distribution of the feed through a reactor where a bed of solid catalyst particles is used with a downward flow of mixed liquid and vapor therethrough.

Heretofore, there have been proposals for dealing with the distribution of a combined vapor and liquid feed through a fixed bed of catalyst particles. Among the known prior proposals there are three U.S. patents as follows:

U.S. Pat. No. 3,112,256 Young, et al. Nov. 26, 1963,
U.S. Pat. No. 3,992,282 Grosboll, et al. Nov. 16, 1976,
4,235,847 Scott Nov. 25, 1980.

The Young, et al. patent discloses a fixed bed reactor with an upper plate or partition. That partition has a plurality of notched downcomers through which the liquid and vapor mixture must flow. Beneath that partition, it uses a plurality of baskets through which the feed mixture flows before reaching the bed of catalyst therebeneath. There is no structure for forming liquid pools around which vapor may flow, in order to make the distribution of the vapor-liquid flow through the catalyst bed more uniform.

The Grosboll, et al. patent discloses a bed of catalyst particles and it employs a plurality of track baskets in the bed. It is concerned with the structure of the trash baskets, per se, and the relationship of them to the bed of catalyst. It acts so as to shift the location of the removal of particulate impurities from the fluid stream flowing through the reactor bed. The removal takes place at a layer of alumina balls on top of the catalyst bed until the impurities gather and restrict that flow enough to send it into and through the trash baskets. There is no division of the fluid stream viz-a-viz liquid and vapor as the stream flows through the bed.

The Scott patent discloses a complex structure with an upper catalyst bed and a lower catalyst bed separated by a space. In that space the reactant stream is separated and remixed to create a froth of liquid vapor mixture that goes through the lower catalyst bed. In the foregoing space the reactant flow is treated to a vaporous quench and also to a liquid quench in order to create the froth. It employs flat perforated plates to support the catalyst beds, and there is no separate flow of liquid and vapor into or through either bed.

It is an object of this invention to provide improved uniform distribution of a mixed liquid and vapor stream in trickle flow through a bed of solid particles.

Another object of the invention is to provide an improved method and apparatus for distributing a mixed stream of liquid and vapor uniformly throughout a bed of solid catalyst particles.

Yet another object of the invention is to control the flow of a mixed stream of liquid and vapor through a bed of solid particles in order to have uniform flow through the bed. It involves creating pools of the liquid in contact with the upper surface of the bed and providing passage for the vapor between the liquid pools for mixing with the liquid in the bed of solid particles.

SUMMARY OF THE INVENTION

Briefly, the invention is in a trickle bed flow reactor, having a bed of solid catalyst particles for use in lube oil processes or the like. In the reactor said flow includes both liquid and vapor flowing through said catalyst bed, and the improvement comprises means for distributing said liquid uniformly through said catalyst bed. The said distributing means comprises means for holding a plurality of liquid pools above said catalyst bed at a predetermined minimum quantity of liquid flow, and means for permitting vapor flow through said distributing means between said liquid pools.

Again briefly, the invention is in a trickle bed flow reactor having a bed of solid catalyst particles for use in lube oil processes or the like wherein said flow includes both liquid and vapor flowing downward through said catalyst bed. The improvement in such reactor comprises means for distributing said liquid uniformly through said catalyst bed. The said distributing means comprises a corrugated tray above said catalyst bed, and perforations in the valleys of said corrugated tray having a size for holding liquid pools in said valleys at a predetermined minimum rate of flow of said liquid. It also comprises perforations in the peaks of said corrugated tray for permitting said vapor flow therethrough.

Once more briefly, the invention is in combination with a reactor having at least one bed of solid catalyst particles. The reactor also has an inlet at the top of said reactor for introducing a mixed stream of liquid and vapor for downward flow through said catalyst bed, and means for distributing said mixed stream uniformly across said catalyst bed. In that combination, the improvement comprises a corrugated tray extending across said reactor above said catalyst bed, and first perforation means through the valleys of said tray corrugations. The said first perforations having a predetermined size relative to the area of said valleys for retaining pools of said liquid at a flow rate of said stream greater than a predetermined minimum, and second perforation means through the peaks of said tray corrugations for permitting said vapor to flow past said pools of liquid.

BRIEF DESCRIPTION OF THE DRAWINGS

The foregoing and other objects, and benefits of the invention will be more fully set forth below in connection with the best mode contemplated by the inventors of carrying out the invention, and in connection with which there are illustrations provided in the drawings, wherein:

FIG. 1 is a schematic longitudinal cross-section illustrating a reactor embodying a preferred form of the structure in accordance with the invention;

FIG. 2 is an enlarged fragmentary showing of the structure illustrated in FIG. 1, taken at the upper left hand corner of the upper catalyst bed, as indicated by the dashed line circle in FIG. 1;

FIG. 3 is an enlarged fragmentary showing of the lower left hand corner of the upper catalyst bed, as indicated by the dashed line circle in FIG. 1;

FIG. 4 is an enlarged fragmentary view of the upper left hand corner of the lower catalyst bed, as indicated by the dashed line circle in FIG. 1;

FIG. 5 is an enlarged fragmentary view of the lower left hand corner of the lower catalyst bed, as indicated by the dashed line circle in FIG. 1; and FIG. 6 is an enlarged longitudinal cross-section showing one of the scale baskets which are located near the top of the reactor.

DETAILED DESCRIPTION

In so called trickle-bed-flow reactors, there is a bed of solid catalyst particles that has a mixed liquid and vapor stream of reactant applied so as to flow through the bed in order to obtain the desired reaction. It has been found that the liquid distribution to the catalyst bed in a trickle (non-dispersed) flow regime is critical. Heretofore, suggested arrangements or structures have not provided good distribution as oil quantity and/or quality varies.

A typical reactor of the type to which this invention applies is illustrated schematically in FIG. 1. There is a reactor vessel 11, that has an inlet 12 t the top through which the reactants are introduced. In the illustrated embodiment, the reaction may be one for lube oil hydro-finishing or for lube oil catalytic dewaxing. In the case of hydo-finishing the reactants which are introduced through the inlet 12 are a lube oil along with hydrogen which together make mixed liquid and vapor stream of reactants. Such mixed stream of liquid and vapor flows in through the inlet 12. It is disbursed radially by an inlet deflector cone 15 located at the bottom of a slotted cylindrical liner 16. There may be a catcher pan 17 which is located beneath the distribution cone 15 underneath the lower end of the liner 16. However, it is usually omitted.

The mixed stream flows down onto a solid basket tray 20 that supports a plurality of scale baskets 21 through which the mixed stream flows in order to screen out any foreign solid matters, such as scale or the like. The stream of liquid and vapor then flows through a perforated tray 24, which will be described in greater detail hereafter. Tray 24 is located at the top of a catalyst bed 25 that rests on a layer of inert balls 26 which are illustrated in FIG. 3. Balls 26 are supported on a grating 29 (see FIG. 1) or other feasible support means.

The stream of reactants then flows on down to a sloped collector tray 30. At the center of tray 30 there is a notched and slotted sleeve 31 with another deflector cone 33 at the bottom thereof. The stream then flows through a perforated tray 34 onto a pair of trays 37 and 38, which will be described in greater detail hereafter. Next, there is another catalyst bed 41 that is supported on a series of different sized inert balls 42, 43 and 44 which are illustrated in FIG. 5. Finally, there is an outlet collector 47 located above an outlet 48.

The FIG. 1 representation illustrates in general a trickle bed flow type reactor. It has at least one bed of solid catalyst particles that are used in a process such as lube oil hydrogenation, or the like. Such a process involves the flow which includes both luquid and vapor passing through the catalyst bed.

While various different structures and systems for disbursing the flow of reactant through such a reactor have been employed, there has been difficulty in obtaining a uniform distribution. In this invention a uniform distribution of the reactant stream is obtained by having means for holding a plurality of liquid pools above the catalyst bed. Such pools form at a predetermined minimum rate of liquid flow, and the uniform distribution is also obtained by means for permitting vapor flow through the distributing means between the liquid pools. Thus, with reference to FIG. 2 it will be observed that the perforated tray 24 which is located above the catalyst bed 25 is shaped into a corrugated form with valleys 51 and peaks 52. By designing the size of perforations 55 in the tray 24 the foregoing predetermined minimum quantity of liquid flow will gather in pools of liquid 56 in the valleys 51 and the vapor will flow past these pools of liquid through the perforations 55 that are located in the peaks 52 and above the level of pools 56.

Published data has indicated that flow of a liquid through a distributor plate hole does not significantly disburse once contact is made with the solid particles comprising a bed of catalyst there beneath. It has been thought that such dispersion is no more than two to three inches. Consequently, when a corrugated tray in accordance with this invention is employed the distance between peaks and valleys of the corrugation may be designed with comparable spacing. The valleys 51 will be designed so as to contain the above described pools of liquid 56, while permitting the vapors to flow through the perforations 55 that are above the level of the liquid on both sides of the pools 56. The result creates a uniform distribution of liquid and vapor as the reactants flow down through the catalyst bed 25.

It may be noted that (as illustrated in FIG. 2) the use of a corrugated tray, e.g. tray 24 will probably necessitate the provision of support rods. For example, there is a rod 59 shown in FIG. 2. Such support rods will be hung from support beams e.g. beams 60 illustrated in FIG. 1. In this manner, interference with liquid distribution in the catalyst bed 25 will be avoided.

It will be appreciated that there may be a plurality of corrugated trays employed with the angles of the corrugations offset from one another, if desired. For example, as illustrated in FIG. 4 there is the upper corrugated tray 37 that is oriented with the corrugations at right angles to the lower corrugated tray 38. In this case the catalyst bed 41 is located beneath the lower corrugated tray 38 and in contact with the valleys thereof, while the upper corrugated tray 37 is spaced somewhat above. The action for creating a uniform disbursing of the mixed reactant flow between its liquid and vapor components, is substantially the same as described above in connection with FIG. 2. Thus, in the corrugated tray 37 there are pools of liquid reactant 63 that form in valleys 64 at the above indicated sufficient rate of flow of the reactant fluid. At the same time, the vapor component may flow through perforations 67 in the peaks and above the level of liquid in the valleys of the tray 37. Thus, the vapor flows past the edges of the liquid pools 63. Similarly, the corrugated tray 38 has perforations 70, some of which are in the valleys 71 of tray 38 and others in the peaks 72. In this case there are pools of liquid 75 that extend across the vessel 11 at right angles to the pools 63. There are support rods like a rod 78 for the corrugated tray 37 and 38. These rods are hung from beams 79 (FIG. 1), so as to avoid interference with the liquid distribution in the catalyst bed 41.

FIG. 6 illustrates typical structure for the scale baskets 21, shown in FIG. 1. It will be appreciated that there is an inlet 81 at the top of each basket 21. The reactant stream of combined liquid and vapor flows through the inlet 81 and out the screen structure on the outside cylindrical surface of the basket 21. Also, it will be appreciated that steps may be taken, e.g. by applying a lip weir (not shown) at the top of each basket 21, in order to insure that liquid will flow through all of the baskets. In addition, it will be appreciated that by locating the baskets 21 in a particular pattern (not shown) they may be oriented relative to the corrugations of the corrugated tray 24 such that the liquid from the baskets will tend to fall on substantially all of the ripple tray troughs or valleys. E.g., if the troughs were oriented parallel to the lines of basket trays, liquid might fall in parallel lines and skip some of the troughs. Therefore, by orienting the baskets along lines at forty-five degrees to the lines of the peaks and valleys of corrugation, that tendency for skipping may be minimized. Similarly, if the baskets are located in a triangular pattern the ripple peaks and valleys or troughs may be oriented at thirty degrees, so as to obtain maximum liquid flow for filling all the troughs.

It may be noted that the invention applies to a catalytic reaction wherein there is a bed of solid catalytic particles that has a liquid and gas mixture flow downward therethrough in connection with the reaction. The procedure is one for spreading said mixture uniformly throughout the catalyst bed. It comprises forming a plurality of pools of said liquid above the bed of catalyst with a minimum rate of flow of said mixture. The procedure also involves permitting flow of said gas between said pools of liquid, whereby said liquid and gas mixture is spread uniformly over the said catalyst bed.

While particular embodiments of the invention have been described above in considerable detail, this is not to be taken as in any way limiting the invention but merely as being descriptive thereof.

We claim:

1. In a catalytic reaction wherein a bed of solid catalyst particles has a liquid and gas mixture flow downward therethrough for said reaction,
   a procedure for spreading said mixture uniformly throughout said catalyst bed, wherein the improvement comprises:
   providing means for defining a plurality of pools of said liquid above said bed of catalyst under minimum rates of flow of said mixture, and
   permitting flow of said gas through said means at positions located between said pools of liquid whereby said liquid and gas mixture is spread uniformly over said catalyst bed.

2. The invention according to claim 1, wherein said pools of liquid extend transversely across said bed of catalyst.

3. In a trickle bed flow reactor having a bed of solid catalyst particles for use in lube oil processes or the like,
   wherein said flow includes both liquid and vapor flowing through said catalyst bed, the improvement comprising
   means for distributing said liquid uniformly through said catalyst bed,
   said distributing means comprising tray means having a plurality of depressions defined therein for holding a plurality of liquid pools above said catalyst bed when operated at a predetermined minimum rate of liquid flow, and
   means for permitting vapor flow directly through said tray means at a plurality of positions located between said liquid pools.

4. The invention according to claim 3, wherein said tray means further comprises perforations located within said depressions.

5. The invention according to claim 4, wherein said means for permitting vapor flow comprises additional perforations through said tray means.

6. The invention according to claim 5, wherein said depressions are defined by valleys of corrugation within said tray means.

7. The invention according to claim 6, wherein said additional vapor flow perforations are through peaks of said corrugation.

8. In a trickle bed flow reactor having a bed of solid catalyst particles for use in lube oil processes or the like,
   wherein said flow includes both liquid and vapor flowing downward through said catalyst bed, the improvement comprising means for distributing said liquid uniformly through said catalyst bed,
   said distributing means comprising
   a corrugated tray above said catalyst bed,
   means for defining a plurality of perforations in the valleys of said corrugated tray having a size for holding liquid pools in said valleys at a predetermined minimum rate of flow of said liquid, and
   means for defining a plurality of perforations in the peaks of said corrugated tray for permitting said vapor flow therethrough.

9. In a reactor having at least one bed of solid catalyst particles,
   an inlet at the top of said reactor for introducing a mixed stream of liquid and vapor for downward flow through said catalyst bed, and
   means for distributing said mixed stream uniformly across said catalyst bed,
   the improvement comprising: said distributing means including means for retaining a plurality of pools of said liquid component of said mixed stream when operated at a flow rate of said mixed stream which is greater than a predetermined minimum, and
   means for permitting flow of said vapor component past said plurality of pools whereby said mixed stream is distributed uniformly at varying flow rates of said liquid and vapor.

10. In combination according to claim 9, wherein said means for retaining said plurality of pools are defined by corrugation valleys, and
    said vapor flow permitting means are defined by corrugation peaks having means for defining perforations therethrough.

11. In a reactor having at least one bed of solid catalyst particles,
    an inlet at the top of said reactor for introducing mixed stream of liquid and vapor for downward flow through said catalyst bed, and
    means for distributing said mixed stream uniformly across said catalyst bed,
    the improvement comprising
    a corrugated tray extending across said reactor above said catalyst bed,
    first perforation means through the valleys of said tray corrugations,
    said first perforations having a predetermined size relative to the area of said valleys for retaining pools of said liquid at a flow rate of said mixed stream greater than a predetermined minimum, and
    second perforation means through the peaks of said tray corrugations for permitting said vapor to flow past said pools of liquid.

* * * * *